United States Patent [19]
Harrington et al.

[11] Patent Number: 5,631,417
[45] Date of Patent: May 20, 1997

[54] MASS AIR FLOW SENSOR STRUCTURE WITH BI-DIRECTIONAL AIRFLOW INCIDENT ON A SENSING DEVICE AT AN ANGLE

[75] Inventors: Charles R. Harrington; Michel F. Sultan, both of Troy, Mich.

[73] Assignee: General Motors Corporation, Detroit, Mich.

[21] Appl. No.: 523,987

[22] Filed: Sep. 6, 1995

[51] Int. Cl.$^6$ .................................................. G01F 1/68
[52] U.S. Cl. ........................................... 73/204.26
[58] Field of Search ................... 73/204.26, 204.21, 73/204.22, 204.25, 204.23, 861.63, 170.12

[56] References Cited

U.S. PATENT DOCUMENTS

| | | | |
|---|---|---|---|
| 4,080,821 | 3/1978 | Johnston | 73/27 R |
| 4,317,365 | 3/1982 | Lauterbach | 73/204.26 |
| 4,576,050 | 3/1986 | Lambert | 73/861.05 |
| 4,713,970 | 12/1987 | Lambert | 73/861.05 |
| 4,782,708 | 11/1988 | Harrington et al. | 73/861.05 |
| 4,864,855 | 9/1989 | Shiraishi et al. | 73/204.26 |
| 5,086,650 | 2/1992 | Harrington | 73/204.21 |
| 5,263,380 | 11/1993 | Sultan et al. | 73/204.26 |

FOREIGN PATENT DOCUMENTS

| | | |
|---|---|---|
| 1080762 | 12/1954 | France . |
| 2036332 | 6/1978 | United Kingdom . |

OTHER PUBLICATIONS

Breakthrough in Reverse Flow Detection—A New Mass Air Flow Meter Using Micro Silicon Technology, SAE Technical Paper Series No. 950433, International Congress & Exposition Detroit, Michigan, Feb. 27–Mar. 2, 1995.

*Primary Examiner*—Richard Chilcot
*Assistant Examiner*—Harshad Patel
*Attorney, Agent, or Firm*—Anthony Luke Simon

[57] ABSTRACT

A mass air flow sensor comprising: a sensing device with a substantially flat surface from a first point to a second point in a flow path, a heating element substantially centrally located between the first and second points, a first sensing element located between the first and second points on a first side of the heating element in the flow path direction, a second sensing element located between the first and second points on a second side of the heating element opposite the first side in the flow direction; and an air foil mounted a predetermined distance apart from the sensing device having a surface facing the heating element and the first and second sensors, wherein the air foil deflects air flow past the sensing device to be incident on the sensing device at an angle, wherein the air foil is symmetrical with respect to a line perpendicular to a center of the heating element and wherein bi-directional air flow past the sensing device is substantially free of turbulence between the first and second points.

18 Claims, 6 Drawing Sheets

MASS AIR FLOW SENSOR STRUCTURE WITH BI-DIRECTIONAL AIRFLOW INCIDENT ON A SENSING DEVICE AT AN ANGLE

BACKGROUND OF THE INVENTION

Many automotive vehicles with internal combustion engines use mass air flow meters that are located upstream of the internal combustion engine to measure the amount of air flowing into the engine. Responsive to the mass air flow information, the vehicle's engine controller controls fuel flow into the engine to reduce pollution emission levels, increase fuel economy and increase engine performance. To optimize system performance, it is desirable that the mass air flow meter respond quickly enough to supply information representative of the measure of mass air flow into each cylinder of the engine.

One challenge that occurs in attempting to measure mass air flow into the engine is especially prevalent in four cylinder engines. This challenge is air pulses in the intake duct caused by the engine valving during intake and exhaust strokes. Four cylinder engines can generate oscillations of significant amplitude in the intake air flow and engine valve overlap can cause brief periods of flow out of the cylinder intake manifold, causing brief periods of reverse flow in the intake ducts. This bi-directional mass air flow pulsation can cause significant mass air flow meter errors if the mass air flow meter and/or the measurement technique are insensitive to flow direction. Thus, it is advantageous to have a bi-directional mass air flow sensing device especially to control four cylinder engine fueling using mass air flow sensing strategies.

A mass air flow sensor suitable for batch fabrication and associated control circuitry have been described in U.S. Pat. Nos. 4,576,050, 4,713,970, 4,782,708, 5,086,650, and 5,263,380, all assigned to the assignee of this invention.

Figures 1, 2:
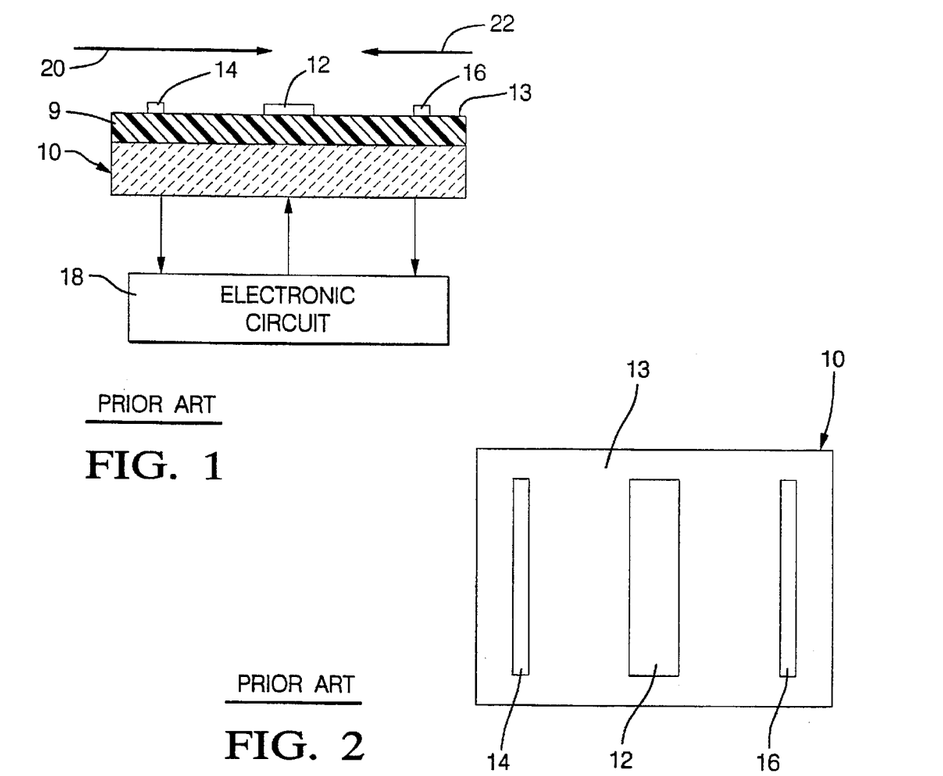
FIG. 1 illustrates a prior art bi-directional flow sensing device of the type for use with this invention.
FIG. 2 illustrates a top view of the sensing device of FIG. 1.

FIGS. 1 and 2 illustrate schematically side and top views, respectively, of a typical bi-directional mass air flow sensing device according to these prior patents. The sensing device 10 is centered on a planar substrate such as silicon chip 9 and consists of a central heater 12 and two temperature sensitive resistors (thermistors) 14, 16 located equidistantly upstream and downstream from the heater 12. The two thermistors 14, 16 are at equal temperature in zero-flow conditions but are at different temperatures when fluid flows past sensing device 10. More particularly, the electronic circuit 18 causes heater 12 to generate heat that propagates more toward the downstream thermistor 14, 16 than the upstream thermistor 16, 14 resulting in a positive temperature difference between the downstream and upstream thermistors 14, 16. The sensor output is proportional to the instantaneous temperature difference between thermistors 14 and 16 and increases monotonically with flow magnitude. A negative difference between the downstream and upstream thermistors 14 and 16 occurs during reverse flow conditions. Thus the sensing device 10 is responsive to flow in both the direction indicated by arrow 20 and the reverse direction indicated by arrow 22.

Figure 3:
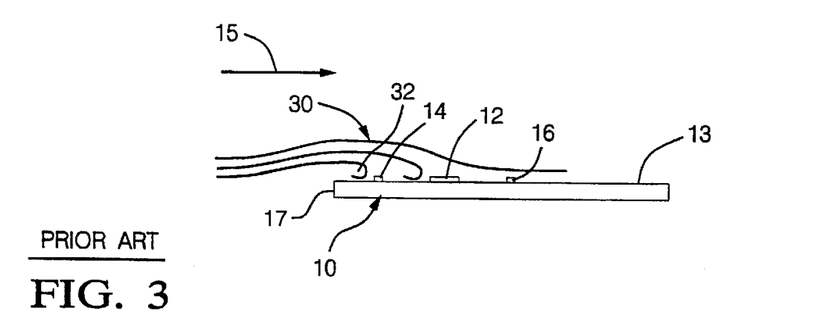
FIGS. 3, 4 and 5 illustrate prior art implementation of the sensing device in FIG. 1.

Referring now to FIG. 3, the sensing device 10 is positioned in a duct with the sensing elements 12, 14 and 16, aligned orthogonal to the fluid flow axis 15 and the device's planar surface 13 parallel to the flow axis 15. In this orientation, the tangential component of fluid flow velocity within the boundary layer near the sensing surface varies in relation to the distance from the surface 13 and, close to the sensing elements 12, 14 and 16, is much less than the free stream velocity through the duct. The leading edge 17 of the sensing device 10 perturbs the flow. The flow perturbations 32 continue across the device 10 and are incident on the sensing elements 12, 14, 16 causing recirculation in the regions of the elements 12, 14 and 16 taking measurements. These and other flow phenomena may cause instability in the boundary layer thickness above the sensing location on the device 10, even in constant flow conditions. This impairs the precision of the flow measurement signal provided by the device 10 since the measurement signal may be a non-representative sampling of the flow through the duct. As a result the sensor output has a high noise content.

Figure 4:
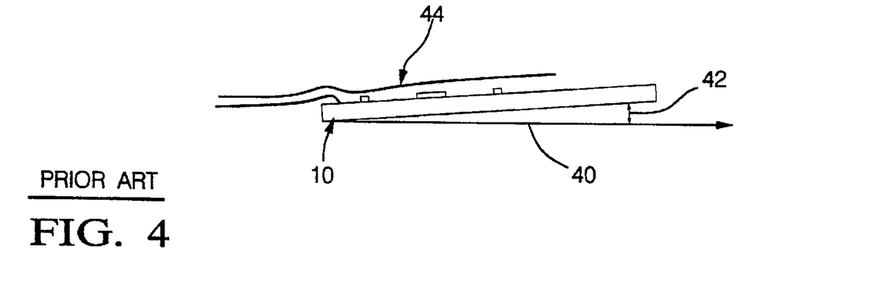

The above-mentioned U.S. Pat. No. 5,086,650 teaches that limitations associated with poor signal to noise ratio for the flow sensors similar to FIG. 3 may be overcome by tilting the sensing surface of the device into the flow as shown in FIG. 4. The angle 42 between the plane of the sensing device 10 and the flow axis 40 is typically in the range of 5°–10°. This orientation of the device 10 reduces the effects of turbulence caused by the leading edge of the device, as illustrated by the smooth flow line, reference 44.

Also by tilting the device 10 as shown in FIG. 4, the signal magnitude increases for all forward flow values because the orientation of the device 10 in the flow path causes compression of the air above the device surface, thinning the boundary layer so that the boundary layer remains more constant over the device and eliminates turbulence caused by the leading edge of the device.

The '650 patent illustrates that boundary layer thickness and stability is a critical parameter governing the performance of the mass air flow sensor. A limitation of the configuration shown in FIG. 4, however, is that the device when so oriented cannot be used not bi-directionally. However, FIG. 5, which is also shown in the '650 patent, illustrates how the tilted orientation of the same device 10 can be used to provide bi-directional air flow sensing. The sensing device 10 is mounted on a support 50 at a corner 54 of an elbow in the duct housing 51. Duct portions 52 and 56 branch off from the corner 54 at angles of approximately 15° from each other. This allows flow of air through the duct 51 to be incident on the device 10 at an angle to the device surface from either direction 58 or direction 60. The configuration in FIG. 5 allows bi-directional flow measurement taking advantage of the tilting orientation of the sensor with respect to flow to reduce boundary layer thickness above the sensing elements.

SUMMARY OF THE PRESENT INVENTION

It is an object of this invention to provide a mass air flow sensor.

Advantageously, this invention provides a mass air flow sensor that provides a sensor output with decreased sensor noise and increased sensor signal magnitude.

Advantageously, this invention provides a mass air flow sensor that reduces air perturbations proximate to a planar sensing surface of the sensing device and provides a smooth boundary layer close to the planar sensing surface. Advantageously this invention provides a mass air flow sensor that senses bi-directional mass air flow without requiring the sensor to be tilted in the flow path or to be mounted in an elbow or corner of a duct.

Advantageously, then, this invention provides a mass air flow sensor that achieves all of these advantages and is capable of being easily mounted in either a straight duct or an elbow or bent duct in an automotive vehicle internal combustion engine air intake system.

Advantageously then, in a preferred example, this invention provides the improvements recited herein according to the structure comprising a sensing device with a substantially flat surface from a first point to a second point in a flow path, a heating element substantially centrally located between the first and second points, a first sensor located between the first and second points on a first side of the heater in the flow path direction, a second sensor located between the first and second points on a second side of the heating element opposite the first side in the flow direction, and an air foil mounted a predetermined distance apart from the sensor having a surface facing the heater and the first and second sensors that deflects airflow past the sensing device to be incident on the sensing device at an angle, wherein the air foil is symmetrical with respect to a line perpendicular to a center of the heating element and wherein bi-directional air flow past the sensing device is substantially free of turbulence between the first and second points.

Advantageously then, this invention provides a novel structure that makes use of the phenomenon taken advantage of in the '580 patent of providing air flow that strikes the sensor at an angle. Instead of tilting the sensor into the air flow, this invention makes novel use of an air foil to tilt the air flow toward the sensor thus eliminating perturbations in the air around the sensing elements and thus preventing the perturbations from creating a thick boundary between the sensing elements and the air flow past the sensor. Thus the air foil functions to compress the air flow past the sensor to maintain the laminar air flow with a thin boundary layer in the region of the sensor elements. Because the air foil is symmetrical in shape with respect to the heating element, the air foil beneficially shapes the air flow in both directions so that the sensor yields improvements in measurements of the air flow past the sensor in forward and reverse directions. The novel structure according to this invention provides further advantages not heretofore realized in that the single sensor can provide bi-directional mass air flow measurements with the reduced signal noise whether located in a straight duct or in an elbowed duct.

BRIEF DESCRIPTION OF THE DRAWINGS

The present invention will now be described by way of example with reference to the accompanying drawings, in which.

DETAILED DESCRIPTION OF THE INVENTION

Figures 6, 7:
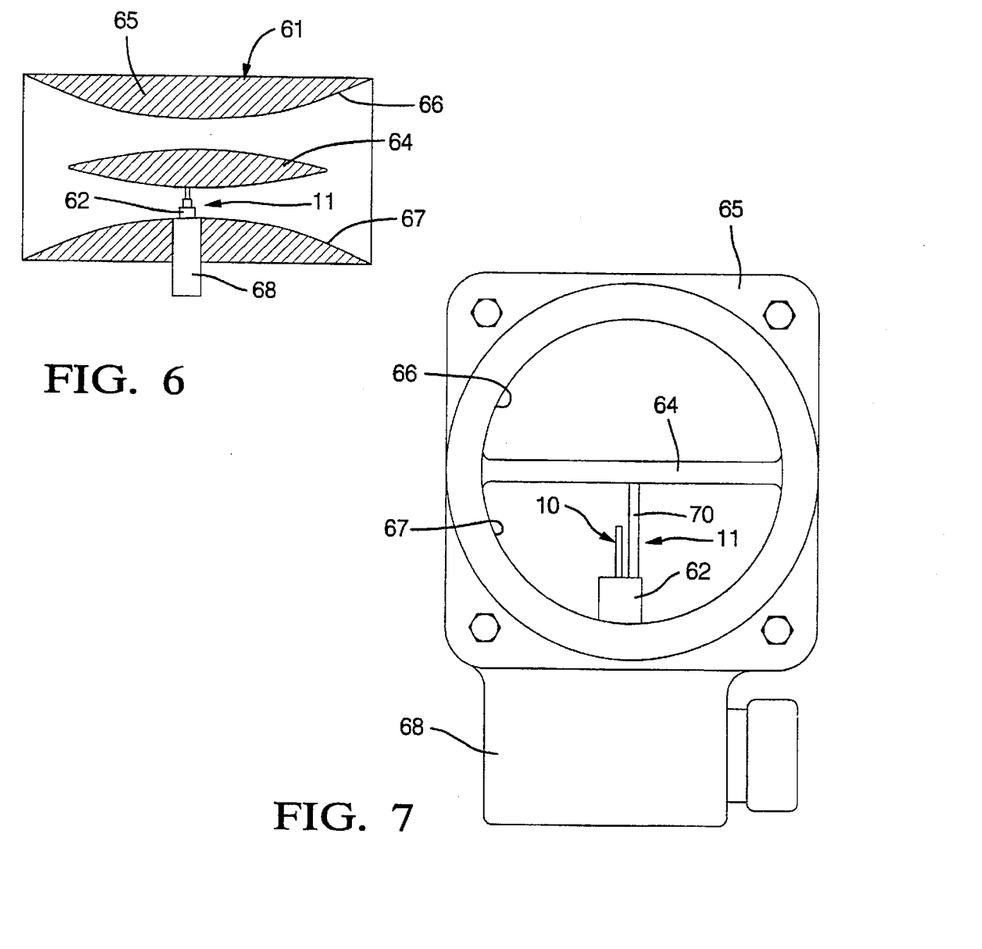
FIGS. 6 and 7 illustrate two cross sections of an air intake duct including a sensor according to this invention.

Referring now to FIG. 6, the sensor 11 according to this invention is shown implemented in an intake duct 61 with a venturi shape, as shown, dividing the duct into two passages 66 and 67 by center vane divider 64. The sensor 11 shown is mounted in the flow passage 67 between support 62 and center vane divider 64, within the housing 65 of the duct.

Venturi tubes, such as the one shown, provide known advantages to the air flow profile on a macroscopic level and are thus preferred. However, the venturi itself does nothing to eliminate perturbations on the surface of the sensing device 10 or to compress the boundary layer of the air flow past the sensing elements 12, 14, 16.

The venturi shown in FIG. 6 is an example and the sensor 11, according to this invention, need not be mounted in a duct with a center vane divider 64 but may be mounted in a duct with only a single main air flow passage or, alternatively, in a bypass duct that allows only a percentage of the air flow through the main duct past the sensor. Such alternative configurations will be easily obtainable by those skilled in the art in view of the teachings set forth herein.

FIG. 7 illustrates a cross section of the duct 61 of FIG. 6 showing a view of the sensor 11. The sensor 11 comprises the flat sensing device 10, suspended at one end from support 62, and cylindrical rod 70, having a circular cross section, extending from the support 62 to the center vane divider 64 across flow passage 67. The components of the sensor 11 including sensing device 10 and the cylindrical rod 70 are small enough so as to not significantly obstruct the flow of air through the passage 67. Attached to housing 65 is circuit housing 68 that may be used to house the circuitry for receiving the signals output from sensing device 10 and for providing a mass air flow measurement signal responsive thereto.

Figure 8:
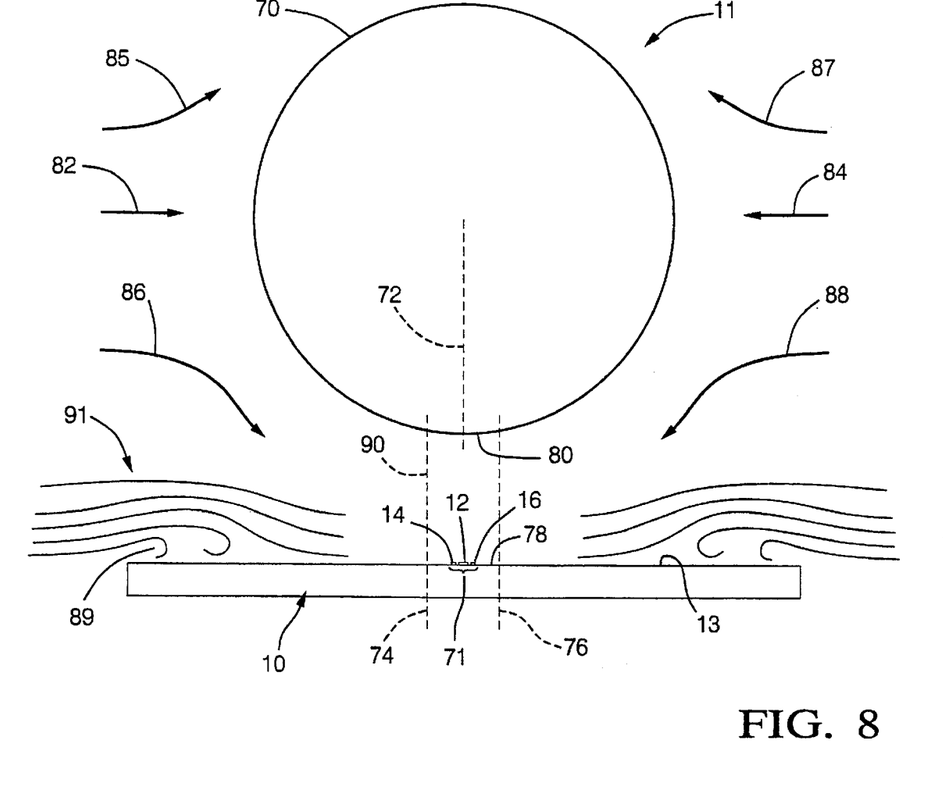
FIG. 8 illustrates an enlarged view of the sensor according to this invention.

Referring now also to FIG. 8, FIG. 8 shows a cross section of the sensor 11 looking toward support 62. The heating element 12 and temperature sensitive elements (thermistors) 14 and 16 of the sensing device 10 are shown between positions 74, 76 along the air flow path being mounted on substrate surface 78 that is substantially flat at least between points 74 and 76.

A typical distance 71 between the outer edges of the two sensing elements 14, 16 is on the order of 300 μm or less. The circular cylindrical rod 70 acts as an air foil mounted a predetermined distance 90 apart from the sensing device 10 and has a surface facing the heater 12 and the two thermistors 14, 16 that deflects airflow past the sensing device 10 so that the air flow is incident on the sensing device 10 at an angle. The air foil comprising rod 70 is symmetrical with respect to a line perpendicular to a center of the heating element 12 so that, for air flow in either direction 82 or 84, the sensing device is substantially free of turbulence between the first and second points 74, 76 and so that the boundary layer between the surface 78 between points 74 and 76 and the laminar air flow is compressed. In this example the operable portions of cylindrical rod 70 are the curved surface 80 that faces the sensing device 10, that is convex with respect to the sensing device 10, and extends from before the first position 74 along the flow path to past the second position 76. The circular cylindrical rod 70 is positioned so that a line drawn between the center of the rod 70 or the curved surface 80 and the center of the heating element 12 is perpendicular to the direction of flow through the passage 67. Thus the rod 70 is symmetrical with respect to the center of the heating element 12.

In the example shown, the planar surface 13 of sensing device 10 is wider than the diameter of rod 70. FIG. 7 illustrates that, in this example, the rod 70 extends beyond the end of sensing device 10.

The rod 70 is placed a distance 90 from the surface 78 of the sensing device 10 and centered above the heating element 12 so that when air flows through the passage 67 in either direction 82 or direction 84, the air is directed around the rod 70, as shown by arrows 85, 86, 87 and 88. When air flows in the direction of arrow 82 and comes into proximity of the sensor 11, a certain percentage is directed, as illustrated by arrow 86, at an angle toward the sensing device 10 providing the beneficial effect of compressing the air in the proximity of elements 12, 14, 16, which has the effect of compressing the boundary between non-turbulent air flow and the elements 12, 14 and 16, eliminating the perturbations 89 in the proximity of the heating element 12 and thermistors 14 and 16. The flow lines 91 illustrate the close boundary layer above the elements 12, 14 and 16.

Likewise, during flow through the passage 67 in the opposite direction 84, the rod 70 and the surface 80 perform the same function of redirecting a portion of the air flow past the rod 70 at an angle toward the sensing device 10, compressing the boundary layer between the laminar air flow and the elements 12, 14 and 16, eliminating the effects of flow perturbations on the boundary layer in proximity of elements 12, 14 and 16.

Figure 5:
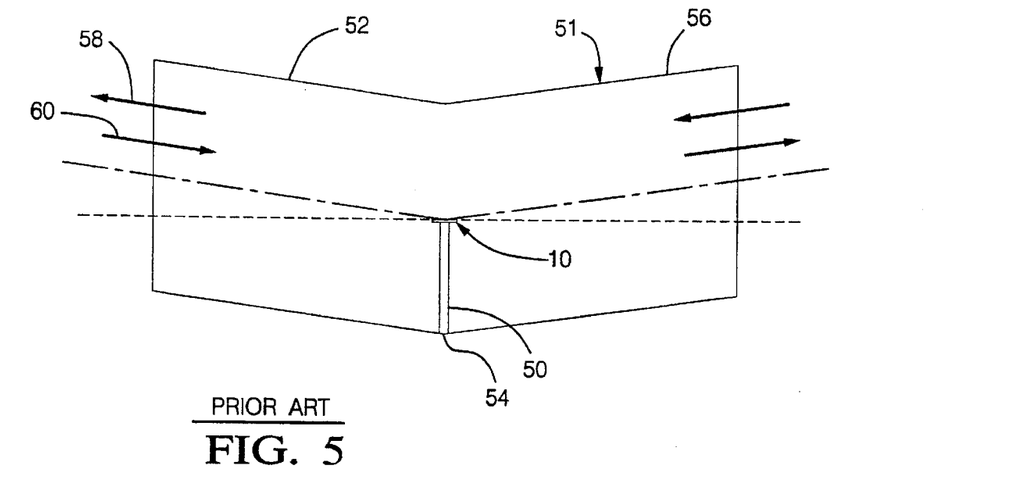

Thus, it will be understood by one skilled in the art that the sensor 11 shown in FIGS. 6, 7 and 8 achieves the same advantage of the prior art shown in FIGS. 4 and 5 and described in the above-mentioned patent, U.S. Pat. No. 5,086,650, of eliminating turbulence in the boundary layer of the sensing device in the proximity of the sensing elements, increasing sensor output levels and decreasing sensor noise. These results increase the precision of the sensor while providing the further advantage according to this invention of achieving all these benefits for bi-directional flow and allowing improved flexibility of sensor location so that the sensor may be in either straight or elbowed ducts.

Figure 9:
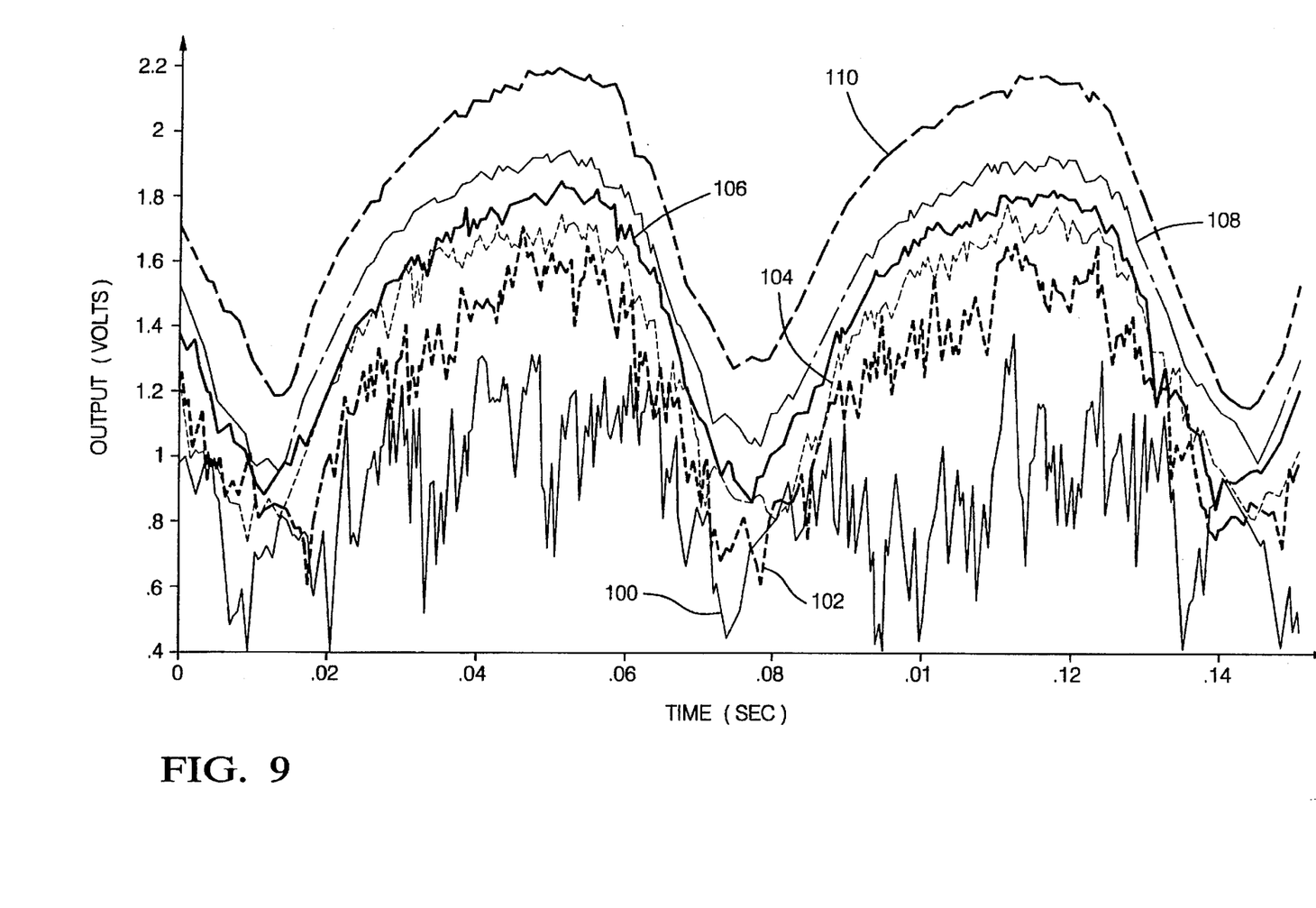
FIG. 9 illustrates improved mass air flow measurement results obtained according to this invention.

Referring now to FIG. 9, the advantages of this invention are shown with respect to the traces 100–110 showing sensor output voltage versus time in pulsing air flow conditions of the type found in automotive engines. Trace 100 illustrates an example output of the prior art sensing device of FIG. 3, which does not have the benefit of a rod 70 proximate to the surface of the sensing device 10. As can be seen, the trace 100 has high noise content that drastically effects the precision of the sensor. Trace 102 represents the signal from the same sensing device when the rod 70 (having an example diameter of 3.2 mm) is placed a distance 90 (FIG. 8) of 5 mm from the elements 12, 14 and 16. As trace 102 illustrates in comparison to trace 100, the signal output from the sensor 11 according to this invention has greater magnitude. More importantly, however, the noise level exhibited by trace 102 is drastically reduced. Traces 104, 106, 108 and 110 show output signals for the same sensing device 10 when the rod 70 is moved to distances 90 (FIG. 8) of 4.8 mm, 3.5 mm, 2.3 mm, and 1.0 mm, respectively, away from the surface 78 of the sensing device 10 in FIG. 8.

As can be seen, as the rod 70 moves closer to the surface 78 of the sensing device 10, the magnitude of the signal increases and the signal noise decreases. The increase in the magnitude Of the signal is due to the fact that the air flow around the rod in the proximity of the sensor surface 78 forces thinning of the boundary layer between surface 78 and the free stream velocity of the air flow. The flow velocity gradient across the boundary layer is approximately linear and by thinning the boundary layer, the sensing elements are exposed to air flow that is closer to the free stream velocity of the air flow through the duct. Thus, the sensor output is greater for a given free stream velocity. More importantly, however, as is especially visible with traces 108 and 110, the sensor output is virtually noise free, drastically improving the precision of the sensor as compared to the prior art represented by trace 100.

Further, the increased signal strength and the drastic decrease in signal noise are achieved regardless of the direction of flow past the sensor and are not limited to sensors placed within any particular ducts, such as at an elbow, but can be placed in any straight or elbowed duct of the type found in engine intake systems.

Figure 10:
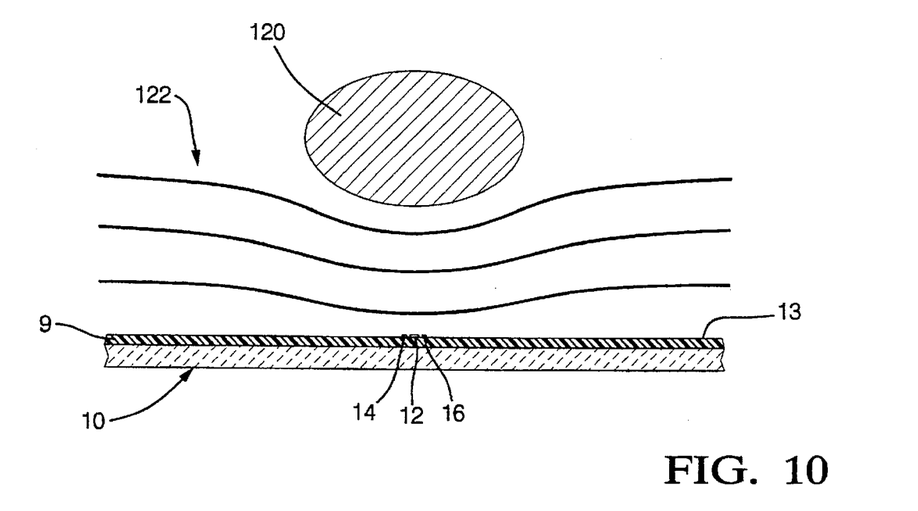
FIGS. 10, 11, 12 and 13 are schematics illustrating example variations in air foil shape for the sensor according to this invention.
Figure 11:
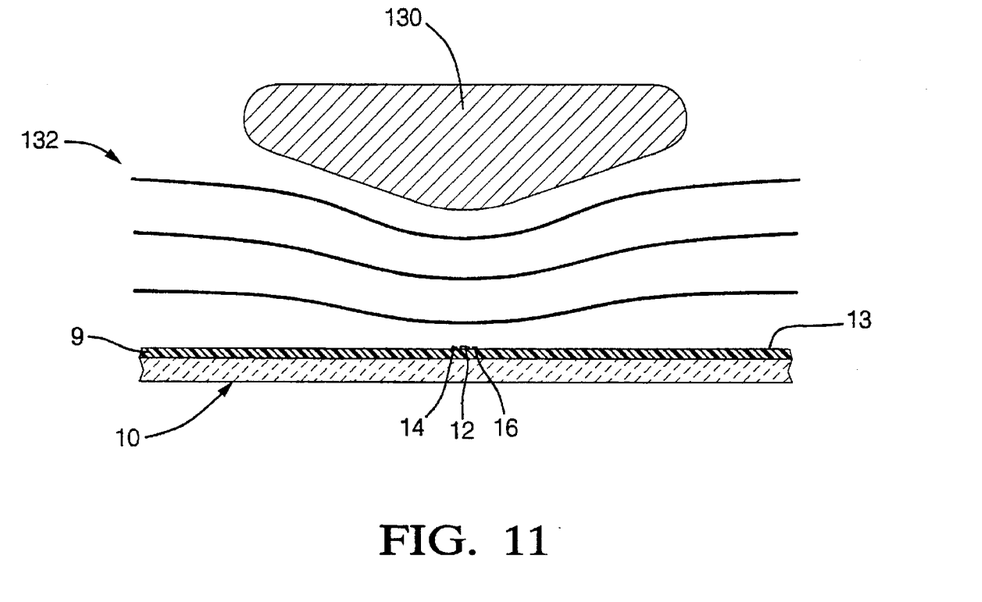

While FIG. 8 illustrates the use of a circular, cylindrical rod 70 as the air foil, FIGS. 10, 11, 12 and 13 illustrate that various other air foil designs may be used according to this invention. FIG. 10 illustrates the use of an elliptical air foil 120 to deflect the airflow 122 at an angle toward the sensing device 10 so that the airflow 122 is substantially free of turbulence in the proximity of the sensing elements 12, 14 and 16. FIG. 11 illustrates an air foil 130 having a rounded triangular shape that deflects the air flow 132 at an angle toward the sensing device 10 so that the airflow 122 is substantially free of turbulence in the proximity of the sensing elements 12, 14 and 16.

Figure 12:
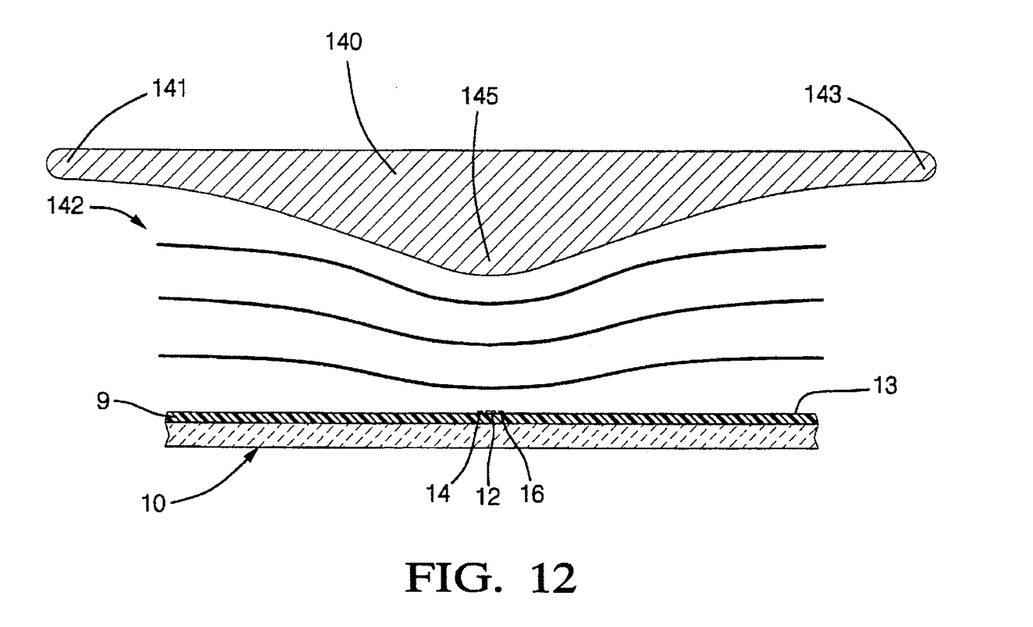

In FIG. 12, the air foil 140 has leading and trailing edges 141 and 143 and a central hump 145 facing toward the sensing device 10. This structure provides a more streamline profile while angling the airflow 142 toward the sensing device 10 so that the airflow 142 is substantially free of turbulence in the proximity of the sensing elements 12, 14 and 16.

Figure 13:
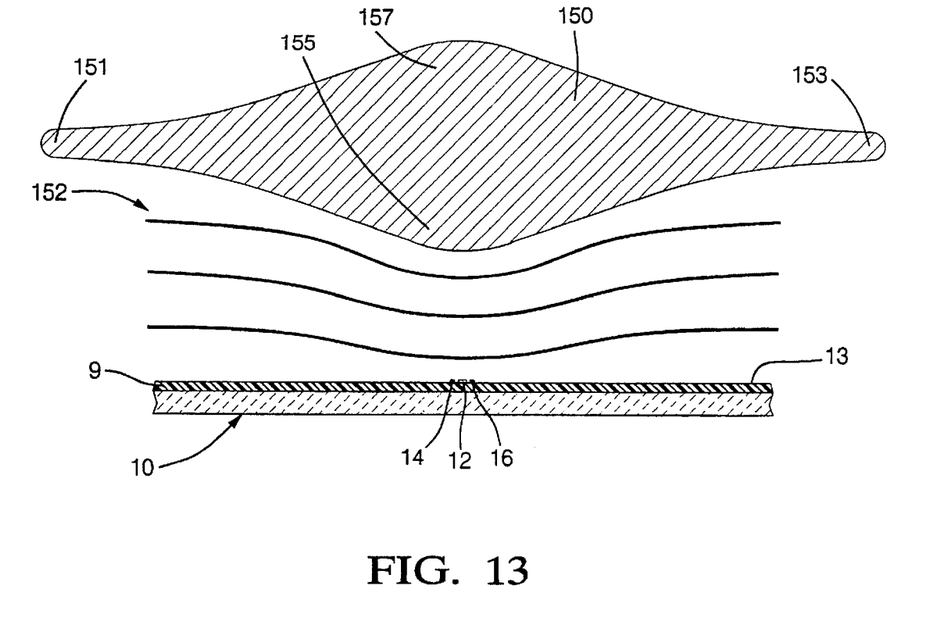

Similar to air foil 140, air foil 150 in FIG. 13 also has leading and trailing edges 151 and 153 and has humps 155 and 157 facing toward and away from the sensing device 10 respectively, to provide a symmetrical streamline air foil design that directs the airflow 152 at an angle toward the sensing device 10 so that the airflow 152 is substantially free of turbulence in the proximity of the sensing elements 12, 14 and 16.

All of the above example structures in FIGS. 10–13 are symmetrical with respect to a line drawn perpendicular to the center of the heating element 12 and act on air flowing in either direction past the sensing device 10. Those skilled in the art will realize that the FIGS. 10–13 are not to scale and that the air foils 120, 130, 140 and 150 are actually much larger with respect to the spacing of the heater 12 and two thermistors 14, 16.

Figure 14:
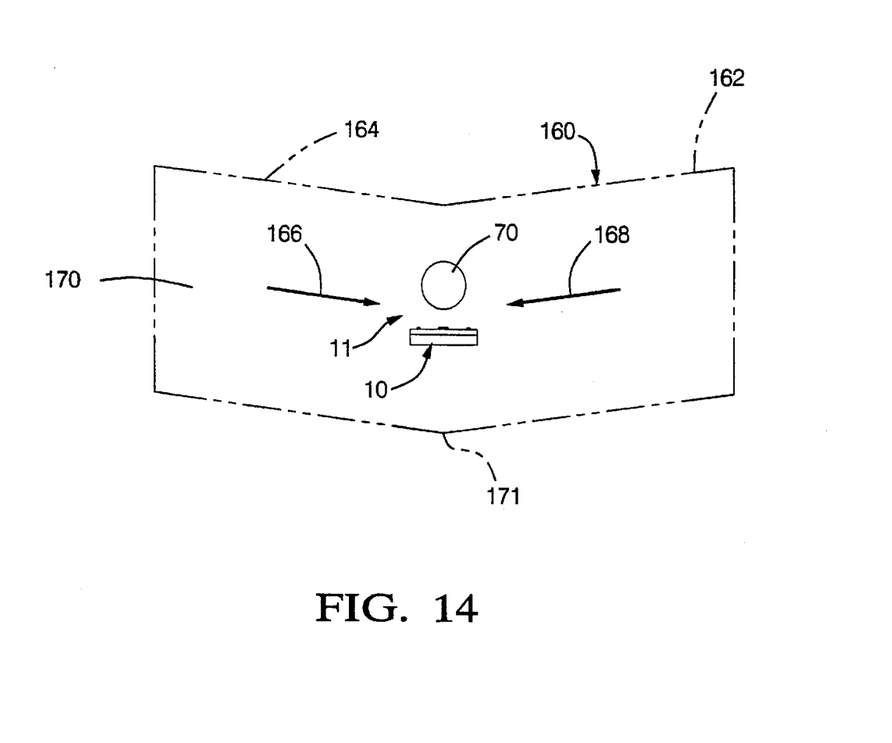
FIG. 14 illustrates a schematic of an alternative sensor implementation according to this invention.

Referring now to FIG. 14, while the sensor 11 according to this invention is suitable for placement in a straight duct as explained above, the sensor may also be placed in an elbowed or bent duct 160 as shown. The sensor is mounted at the elbow 171 of passage 170 and achieves the benefits of this invention whether air flows in the direction 166 from branch 164 or in the direction 168 from branch 162 past the sensor 11.

Thus, as can be seen according to this invention, a mass air flow sensor 11 is provided that yields increased signal strength and decreased signal noise, which increases signal precision of the sensor 11 and also provides a sensor 11 that is suitable for mounting in either straight ducts or bent ducts for detecting hi-directional mass air flow through the duct.

The advantages of copending application, U.S. Ser. No. 08/523,985, filed concurrently with this invention and assigned to the assignee of this invention may also be used with this invention.

A preferred sensor 11 for use with this invention is fabricated from a substrate, such as silicon, having a coextensive polyimide thermal isolation layer of 15–25 μm. A coextensive 300–500 Å thick tantalum oxide sub-layer is deposited on the polyimide isolation layer. A coextensive platinum metalization layer is deposited onto the tantalum oxide layer, about 1000–3000 Å thick. A coextensive superficial layer of tantalum oxide is then applied over the platinum layer with the tantalum oxide sublayer. During all depositions, the substrate is preferably heated to a temperature near but below the polyimide deterioration temperature, which is near 400° C.

The tantalum oxide superficial layer is then patterned to match the desired geometry of the heater 12 and thermistors 14, 16 as shown in FIGS. 1, 2 and 8. A solution of 1 part HF: 3 parts $HNO_3$: 5 parts D.I. $H_2O$ will etch the proper stoichiometry unoxidized $Ta_2O_5$ layer without excessive attack to the photoresist mask. The platinum layer is then patterned to form the heater 12 and the thermistors 14, 16, preferably using the same photoresist mask used for the superficial layer of tantalum oxide. The platinum can be etched with a solution of 3 parts concentrated HCl and 1 part concentrated $HNO_3$ heated to a minimum of 90°–95° C. without significant attack to the photoresist mask. Windows may be opened through the tantalum oxide superficial layer to expose areas on the platinum heater and thermistors that may be coated with Au or another suitable metal to serve as contacts. These windows and contacts are placed in areas so as to not impair the functionality of the heater 12 and/or thermistors 14, 16. To keep the tantalum oxide sub-layer from providing a conductive path between the heater 12 and thermistors 14, 16, the structure is then annealed below 240° C. until the tantalum oxide is converted to an insulator, $Ta_2O_5$. A 1 μm polyimide over-layer is applied using a thin originating solution at a high spin speed and cured. If greater structural integrity is desired, a capping layer of $Ta_2O_5$ is applied. The polyimide over-layer and the tantalum oxide capping layer provide a protective cover for the heater 12 and thermistors 14, 16 without isolating the heater 12 and thermistors 14, 16 from the air flow and without hindering sensor performance.

We claim:

1. A mass air flow sensor comprising:
   a sensing device having a centrally mounted heater located between two temperature responsive sensing elements along a flow path wherein the sensing device is substantially flat between first and second points along the flow path and the heater and sensing elements are all located between the first and second points, and wherein the sensing elements are responsive to heat generated by the heater that propagates upstream in the flow path towards one of the sensing elements and downstream in the flow path towards the other of the sensing elements;
   an air foil having a curved surface convex with respect to the sensing device placed facing the sensing device a predetermined distance therefrom wherein the curved surface is continuously curved in a flow direction of the flow path and extends from before the first point to past the second point along the flow path, wherein the air foil is symmetrical with respect to a center of the heating element and wherein the air foil causes bi-directional air flow to be incident on the sensing device at an angle so that air flow is substantially free of turbulence in the region of the sensing elements.

2. A mass air flow sensor according to claim 1 wherein the air foil is spaced not more than approximately 5 mm from the sensing elements.

3. A mass air flow sensor according to claim 1 wherein a distance between the first and second points is not greater than 300 μm.

4. A mass air flow sensor according to claim 1 wherein the air foil comprises a circular cylindrical rod.

5. A mass air flow sensor according to claim 4 wherein the circular cylindrical rod has a radius of 6 mm or less.

6. A mass air flow sensor according to claim 1 where a distance between the air foil and the sensing elements is approximately 1 mm.

7. A method of sensing mass air flow through a duct comprising the steps of:
   suspending a substrate in the duct, wherein the substrate contains a heater, a first sensing element on a first side of the heater and a second sensing element on a second side of the heater opposite the first side and wherein the substrate is oriented so that air flow passes one of the sensing elements, the heater and then the other sensing element, or vice versa, wherein the heater and first and second sensing elements are located on a substantially flat portion of the substrate, and wherein the sensing elements are responsive to heat generated by the heater that propagates upstream in the flow path towards one of the sensing elements and downstream in the flow path towards the other of the sensing elements;
   using an air foil having a convex surface continuously curved in a direction parallel to the flow path facing the substantially flat portion of the substrate, deflecting flow from a first direction through the duct at an angle toward the substrate so that air flow past the sensing element is substantially free of turbulence in a region of the sensing elements; and
   using the air foil, deflecting flow from a second direction opposite the first direction at an angle against the sensing device so that the air flow is substantially free of turbulence in the region of the sensing elements.

8. A mass air flow sensor comprising:
   a sensing device with a substantially flat surface from a first point to a second point in a flow path, a heating element substantially centrally located between the first and second points, a first sensing element located between the first and second points on a first side of the heating element in a flow path direction, a second sensing element located between the first and second points on a second side of the heating element opposite the first side in the flow path direction, and wherein the sensing elements are responsive to heat generated by the heater that propagates upstream in the flow path towards one of the sensing elements and downstream in the flow path towards the other of the sensing elements; and
   an air foil mounted a predetermined distance apart from the sensing device having an air foil surface that is convex and continuously curved along a direction parallel to the flow path between the first point and the second point facing the heating element and the first and second sensors, wherein the air foil surface deflects air flow past the sensing device to be incident on the sensing device at an angle, wherein the air foil is symmetrical with respect to a line perpendicular to the flat surface and intersecting a center of the heating element and wherein bi-directional air flow past the sensing device is substantially free of turbulence between the first and second points.

9. A mass air flow sensor according to claim 8 wherein the air foil is spaced not more than approximately 5 mm from the sensing elements.

10. A mass air flow sensor according to claim 8 wherein a distance between the first and second points is not greater than 300 μm.

11. A mass air flow sensor according to claim 8 wherein the air foil comprises a circular cylindrical rod.

12. A mass air flow sensor according to claim 11 wherein the circular cylindrical rod has a radius of 6 mm or less.

13. A mass air flow sensor according to claim 8 where a distance between the air foil and the sensing elements is approximately 1 mm.

14. A mass air flow sensor according to claim 8 wherein the sensing device is wider than the air foil.

15. A mass air flow sensor according to claim 8 wherein the sensing device is wider than the air foil surface that deflects air flow past the sensing device to be incident on the sensing device at the angle.

16. A mass air flow sensor according to claim 8 wherein the air foil has an axial length greater than a length of the sensing device.

17. A mass air flow sensor according to claim 8 wherein the air foil has a leading edge, a trailing edge and a body portion, wherein the body portion is positioned directly across a flow space from the heating element and the first and second sensing elements.

18. A mass air flow sensor according to claim 8, wherein the air foil is elliptical in shape.

* * * * *